(12) United States Patent
Li et al.

(10) Patent No.: US 11,260,741 B2
(45) Date of Patent: Mar. 1, 2022

(54) HYBRID POWER DRIVING SYSTEM

(71) Applicant: GAC AION NEW ENERGY AUTOMOBILE CO. LTD, Guangdong (CN)

(72) Inventors: Gang Li, Guangdong (CN); Hongzhong Qi, Guangdong (CN); Anwei Zhang, Guangdong (CN); Yong Yang, Guangdong (CN); Jiangling Zhao, Guangdong (CN); Yang Shang, Guangdong (CN)

(73) Assignee: GAC AION NEW ENERGY AUTOMOBILE CO. LTD, Guangzhou (CN)

( * ) Notice: Subject to any disclaimer, the term of this patent is extended or adjusted under 35 U.S.C. 154(b) by 0 days.

(21) Appl. No.: 16/336,913

(22) PCT Filed: Oct. 10, 2018

(86) PCT No.: PCT/CN2018/109580
§ 371 (c)(1),
(2) Date: Mar. 27, 2019

(87) PCT Pub. No.: WO2019/227814
PCT Pub. Date: Dec. 5, 2019

(65) Prior Publication Data
US 2021/0354548 A1    Nov. 18, 2021

(30) Foreign Application Priority Data

May 30, 2018    (CN) .......................... 201810540899.4

(51) Int. Cl.
*B60K 1/02*    (2006.01)
*B60K 6/442*   (2007.10)
(Continued)

(52) U.S. Cl.
CPC ................ *B60K 6/442* (2013.01); *B60K 1/02* (2013.01); *B60K 6/24* (2013.01); *B60K 6/26* (2013.01);
(Continued)

(58) Field of Classification Search
CPC . B60K 6/442; B60K 1/02; B60K 6/24; B60K 6/26; B60K 6/365; B60K 6/383; B60K 6/387; B60K 6/547; B60L 7/18
See application file for complete search history.

(56) References Cited

U.S. PATENT DOCUMENTS

2015/0011349 A1    1/2015  Downs et al.
2016/0090076 A1*   3/2016  Tsuji .................... B60W 10/113
                                                          477/5
(Continued)

FOREIGN PATENT DOCUMENTS

CN    206141308 U    5/2017
CN    107933285 A    4/2018
(Continued)

*Primary Examiner* — David J Hlavka
(74) *Attorney, Agent, or Firm* — ScienBiziP, P.C.

(57) ABSTRACT

A hybrid power driving system includes an engine, a planetary gear device, a first motor, a clutch gear device, a brake device, an engagement device, an intermediate shaft, and a second motor, the engine and the first motor are connected by the planetary gear device which includes first, second and third rotating elements; the clutch gear device is disposed between the first motor and the planetary gear device, the clutch gear device includes a clutch and a clutch gear and an engagement element connected to the clutch, the clutch gear is connected to the intermediate shaft; the engagement device is configured to engage the third rotating element and the engagement element, or engage the third rotating element and the brake device, or only engage the third rotating element; the brake device is configured to brake or unlock the third rotating element; the second motor is connected to the intermediate shaft.

14 Claims, 11 Drawing Sheets

(51) Int. Cl.
*B60K 6/24* (2007.10)
*B60K 6/26* (2007.10)
*B60K 6/365* (2007.10)
*B60L 7/18* (2006.01)
*B60K 6/387* (2007.10)
*B60K 6/547* (2007.10)
*B60K 6/383* (2007.10)

(52) U.S. Cl.
CPC .............. *B60K 6/365* (2013.01); *B60K 6/383* (2013.01); *B60K 6/387* (2013.01); *B60K 6/547* (2013.01); *B60L 7/18* (2013.01); *B60Y 2200/92* (2013.01)

(56) References Cited

U.S. PATENT DOCUMENTS

| | | | |
|---|---|---|---|
| 2017/0088845 A1* | 3/2017 | Ryan | C12N 15/81 |
| 2017/0236437 A1* | 8/2017 | Malo | G06N 5/046 |
| | | | 434/362 |
| 2017/0282702 A1* | 10/2017 | Kim | B60K 6/547 |

FOREIGN PATENT DOCUMENTS

| | | |
|---|---|---|
| CN | 207416539 U | 5/2018 |
| CN | 208359909 U | 1/2019 |
| JP | 2016002882 A | 1/2016 |

* cited by examiner

HYBRID POWER DRIVING SYSTEM

TECHNICAL FIELD

The present disclosure relates to the technical field of new energy, and more particularly to a hybrid power driving system.

BACKGROUND

At present, transmissions on the market mainly include two types of transmissions namely step-variable transmissions and continuously variable transmissions. The step-variable transmissions are subdivided into manual and automatic transmissions. Most of them provide a limited number of discrete input-output speed ratios through different meshing arrangements of a gear train or a planetary gear train. The adjustment of the driving wheel speed between two adjacent speed ratios is achieved by the speed change of an internal combustion engine. The continuously variable transmissions, whether mechanical, hydraulic, or machine-electric, can provide an infinite number of continuously selectable speed ratios within a certain speed range. Theoretically, the speed change of the driving wheel can be fully completed through the transmission. Thus, the internal combustion engine may operate within the best speed range as much as possible. The continuously variable transmission has better speed adjustment than the step-variable transmission, and can fully utilize the advantages of the maximum power of the internal combustion engine. Therefore, the continuously variable transmission has been the object of research by engineers all over the world for many years.

In recent years, the birth of a motor hybrid technology has opened up a new way to achieve complete power matching between the internal combustion engine and a power wheel. Among many power assembly design schemes, the most representative ones are series hybrid systems and parallel hybrid systems.

In the series hybrid system, an internal combustion engine, a generator (electricity generator), a motor, a shaft system and a driving wheel constitutes a series power chain, and the power assembly structure is extremely simple. The generator and motor combination can be regarded as a transmission in the traditional sense. When used in conjunction with an accumulator such as a battery and a capacitor, the transmission can be used as an energy adjustment device to achieve independent adjustment of speed and torque.

A parallel hybrid system has two parallel independent power trains. One consists of a traditional mechanical transmission, and the other consists of a motor and battery system. The mechanical transmission is responsible for speed adjustment, while the motor and battery system completes power or torque adjustment. In order to fully utilize the potential of the entire system, the mechanical transmission also needs to adopt a continuously variable transmission mode.

Technical Problem

The series hybrid system has the advantages of simple structure and flexible layout. However, since all power passes through the generator and the motor, the power requirement of the motor is high, the volume is large, and the weight is heavy. Moreover, the efficiency of the entire system is low because the energy transfer process is subjected to mechanical-electrical transformation and electrical-mechanical transformation for two times. In the parallel hybrid system, only part of the power passes through the motor system, so the power requirements for the motor are relatively low, and the overall system efficiency is high. However, the parallel hybrid system requires two separate subsystems, which are expensive and usually only used in weak hybrid systems.

SUMMARY

In view of the above, embodiments of the present disclosure provide a hybrid power driving system, which has a simple structure, multiple operating modes and good platformization.

Some embodiments of the present disclosure provide a hybrid power driving system, including an engine, a planetary gear device, a first motor, a clutch gear device, a brake device, an engagement device, an intermediate shaft, and a second motor.

The engine and the first motor are connected by the planetary gear device, the planetary gear device includes a first rotating element, a second rotating element and a third rotating element, the first rotating element is connected to the first motor, the second rotating element is connected to the engine, the third rotating element is connected to the engagement device, and the first rotating element, the second rotating element and the third rotating element are a respective one of a sun gear, a planetary carrier and a gear ring.

The clutch gear device is disposed between the first motor and the planetary gear device, the clutch gear device includes a clutch, a clutch gear connected to the clutch and an engagement element connected to the clutch, and the clutch gear is connected to the intermediate shaft and outputs power to a wheel end through the intermediate shaft.

The engagement device is configured to engage the third rotating element and the engagement element, or engage the third rotating element and the brake device, or only engage the third rotating element.

The brake device is configured to brake or unlock the third rotating element.

The second motor is connected to the intermediate shaft and outputs power to the wheel end through the intermediate shaft.

In at least one embodiment, the first rotating element is the sun gear, the second rotating element is the planetary carrier, and the third rotating element is the gear ring.

In at least one embodiment, the first rotating element is the sun gear, the second rotating element is the gear ring, and the third rotating element is the planetary carrier.

In at least one embodiment, the engagement device includes a first station, a second station and a third station, when being at the first station, the engagement device engages and fixes the third rotating element and the engagement element together, when being at the second station, the engagement device only engages the third rotating element, and when being at the third station, the engagement device engages the third rotating element and the brake device and brakes the third rotating element.

In at least one embodiment, the engine has an engine output shaft, the second rotating element is connected to the engine output shaft, the first motor has a first motor output shaft, the first rotating element is connected to the first motor output shaft, the clutch gear device is disposed on the first motor output shaft, a driving disc of the clutch is fixedly connected to the first motor output shaft, the clutch gear is sleeved on the first motor output shaft, and the engagement element and the clutch gear are fixedly connected to a driven disc of the clutch.

In at least one embodiment, a first gear and a second gear are fixed to the intermediate shaft, and the first gear is meshed with the clutch gear; the second motor has a second motor output shaft, a third gear is fixed to the second motor output shaft, and the third gear is meshed with the first gear; and the hybrid power driving system further includes a differential, a differential gear is disposed on the differential, and the second gear is meshed with the differential gear.

In at least one embodiment, the hybrid power driving system has a first-stage pure electric mode, a second-stage pure electric mode, an extended range mode, a first-stage engine direct-drive mode, a second-stage engine direct-drive mode, a first-stage hybrid power mode, a second-stage hybrid power mode, a third-stage hybrid power mode, and a brake electricity generation mode.

In at least one embodiment, the first motor, the clutch gear device, the planetary gear device and the engine are coaxially disposed.

In at least one embodiment, the second motor and the first motor are disposed in parallel.

In at least one embodiment, the engagement device is a synchronizer, and the brake device is a brake or a one-way clutch.

Beneficial Effect

The hybrid power driving system provided by the embodiments of the present disclosure has a simple overall structure, has multiple operating, modes such as a single-motor pure electric mode, a dual-motor pure electric mode, an extended range mode, two engine direct-drive modes, three hybrid power modes and a brake electricity generation mode, can automatically switch different modes according to a State of Charge (SOC) value and vehicle speed requirement of a battery, and has strong flexibility; moreover, during switching of the operating modes, a second motor participates in driving, and power is not interrupted. In addition, an engine and a first motor are connected by a planetary gear device, the speed ratio is adjustable, and the speed ratio range is large, which can effectively reduce the volume of the first motor. The hybrid power driving system can cover Hybrid Electric Vehicles (HEV) and Plug-in Hybrid Electric Vehicles (PHEV), and the platformization is good.

DETAILED DESCRIPTION OF THE EMBODIMENTS

To further explain the technical means and effects of the present disclosure for achieving the intended purpose of the present disclosure, the present disclosure will be described in detail below with reference to the accompanying drawings and preferred embodiments.

First Embodiment

Figure 1:
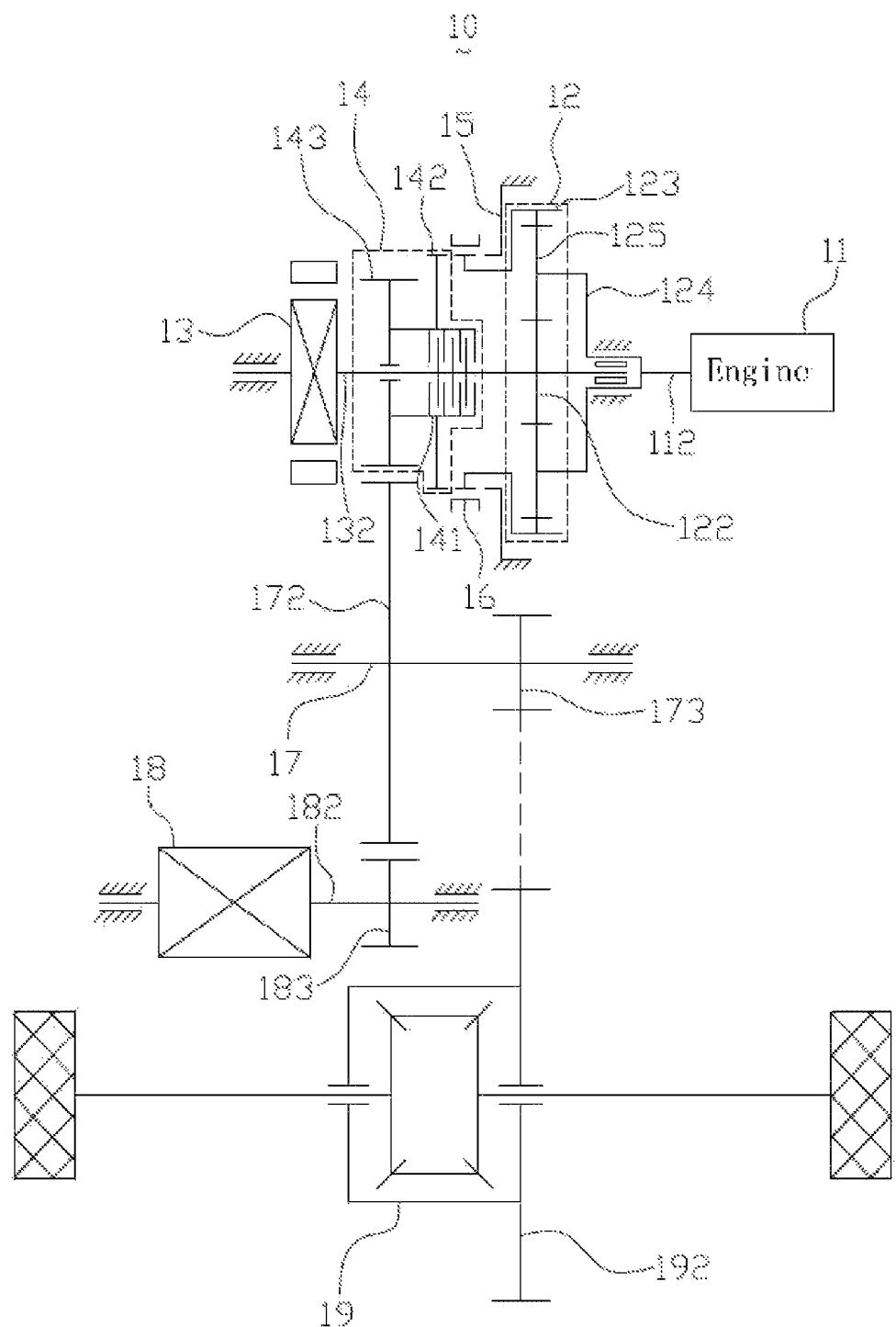
FIG. 1 is a structure diagram of a hybrid power driving system according to a first embodiment of the present disclosure.

FIG. 1 is a structure diagram of a hybrid power driving system according to a first embodiment of the present disclosure. As shown in FIG. 1, the hybrid power driving system 10 includes an engine 11, a planetary gear device 12, a first motor 13, a clutch gear device 14, a brake device 15, an engagement device 16, an intermediate shaft 17, a second motor 18, a differential 19, and a power battery (not shown).

The engine 11 has an engine output shaft 112. In the present embodiment, the engine 11 is, for example, a gasoline engine or a diesel engine.

The first motor 13 has a first motor output shaft 132. The first motor 13 and the engine 11 are disposed coaxially, that is, the first motor output shaft 132 of the first motor 13 and the engine output shaft 112 of the engine 11 are in the same axis. In the present embodiment, the first motor 13 is a driving and electricity generation integrated machine.

The engine 11 and the first motor 13 are connected by the planetary gear device 12. The planetary gear device 12 includes a first rotating element, a second rotating element and a third rotating element, wherein the first rotating element is connected to the first motor 13, the second rotating element is connected to the engine 11, and the third rotating element is connected to the engagement device 16. The first rotating element, the second rotating element and the third rotating element are a respective one of a sun gear 122, a planetary carrier 124 and a gear ring 123. In the present embodiment, the first rotating element is the sun gear 122, the second rotating element is the planetary carrier 124, and the third rotating element is the gear ring 123. The planetary carrier 124 is provided with a planetary gear 125, and the planetary gear 125 is connected to the planetary carrier 124 through a rolling bearing or a sliding bearing. The sun gear 122 is disposed in the gear ring 123, the planetary gear 125 is disposed between the sun gear 122 and the gear ring 123, and the planetary gear 125 is meshed with the sun gear 122 and the gear ring 123, respectively. In the present embodiment, the planetary carrier 124 is connected to the engine output shaft 112, and the sun gear 122 is connected to the first motor output shaft 132.

The clutch gear device 14, the first motor 13, the planetary gear device 12 and the engine 11 are coaxially disposed. The clutch gear device 14 is disposed between the first motor 13 and the planetary gear device 12. The clutch gear device 14 is disposed on the first motor output shaft 132. The clutch gear device 14 includes a clutch 141, a clutch gear 143 connected to the clutch 141 and an engagement element 142 connected to the clutch 141, and the clutch gear 143 is connected to the intermediate shaft 17 and outputs power to a wheel end through the intermediate shaft 17. A driving disc of the clutch 141 is fixedly connected to the first motor output shaft 132, and the clutch gear 143 is sleeved on the first motor output shaft 132, so that the first motor output shaft 132 and the clutch gear 143 are mutually unaffected when rotating. The engagement element 142 and the clutch gear 143 are fixedly connected to a driven disc of the clutch 141, and therefore the clutch gear 143 and the engagement element 142 can synchronously rotate. When the clutch 141 operates (that is, the driven disc is engaged with the driving disc), the clutch gear 143 is fixedly connected to the first motor output shaft 132 through the clutch 141. At this time, the clutch gear 143 may synchronously rotate with the first motor output shaft 132. When the clutch 141 does not operate (that is, the driven disc is separated from the driving disc), the clutch gear 143 is sleeved on the first motor output shaft 132, and the clutch gear 143 may rotate independently of the first motor output shaft 132.

The brake device 15 is configured to brake or unlock the third rotating element (in the present embodiment, it is the gear ring 123). The brake device 15 is, for example, a brake or a one-way clutch. In the present embodiment, the brake device 15 is configured to brake or unlock the gear ring 123. When the brake device 15 operates, the brake device 15 brakes the gear ring 123. When the brake device 15 does not operate, the brake device 15 unlocks the gear ring 123.

The engagement device 16 is configured to engage the third rotating element and the engagement element 142, or engage the third rotating element and the brake device 15, or only engage the third rotating element. Specifically, the engagement device 16 includes a first station, a second station and a third station, when being at the first station, the engagement device 16 engages and fixes the third rotating element and the engagement element 142 together, when being at the second station, the engagement device 16 only engages the third rotating element, and when being at the third station, the engagement device 16 engages the third rotating element and the brake device 15 and brakes the third rotating element. The engagement device 16 is, for example, a synchronizer. In the present embodiment, the first station, the second station and the third station are a left station, an intermediate station and a right station of the synchronizer 16, respectively. When the synchronizer 16 is at the left station, the gear ring 123 and the engagement element 142 are engaged and fixed together, and at this time, the gear ring 123 and the engagement element 142 can synchronously rotate. When the synchronizer 16 is at the right station, the gear ring 123 and the brake device 15 are engaged, and at this time, the brake device 15 brakes the gear ring 123. When the synchronizer 16 is at the intermediate station, the gear ring 123 is separated from the engagement element 142, and the brake device 15 unlocks the gear ring 123.

A first gear 172 and a second gear 173 are fixed to the intermediate shaft 17, the first gear 172 and the second gear 173 are spaced apart from each other, and the first gear 172 and the clutch gear 143 are meshed with each other.

The second motor 18 and the first motor 13 are disposed in parallel, and the second motor 18 is connected to the intermediate shaft 17 and outputs power to a wheel end of a vehicle through the intermediate shaft 17. Specifically, the second motor 18 has a second motor output shaft 182, a third gear 183 is fixed to the second motor output shaft 182, and the third gear 183 is meshed with the first gear 172. In the present embodiment, the second motor 18 is a driving and electricity generation integrated machine.

The differential 19 is provided with a differential gear 192, and the differential gear 192 is meshed with the second gear 173. The differential 19 is configured to adjust the speed difference between left and right wheels. When the vehicle is turning or driving on an uneven road, the left and right wheels are rolled at different speeds.

The power battery is electrically connected to the first motor 13 and the second motor 18, respectively. The power battery supplies electric energy for driving to the first motor 13 and the second motor 18, and electric energy generated by the first motor 13 and the second motor 18 during electricity generation may be stored in the power battery. In the present embodiment, the engine 11 drives the first motor 13 to rotate by the planetary carrier 124 and the sun gear 122 to generate electric energy, which may be stored in the power battery; when the vehicle brakes, power during braking passes through the differential 19, the differential gear 192, the second gear 173, the first gear 172 and the third gear 183 from the wheel end, and then is transmitted to the second motor 18 to drive the second motor 18 to rotate to generate electric energy, which may be stored in the power battery.

The hybrid power driving system of the present embodiment 10 has a first-stage pure electric mode, a second-stage pure electric mode, an extended range mode, a first-stage engine direct-drive mode, a second-stage engine direct-drive mode, a first-stage hybrid power mode, a second-stage hybrid power mode, a third-stage hybrid power mode, and a brake electricity generation mode.

Figure 2:
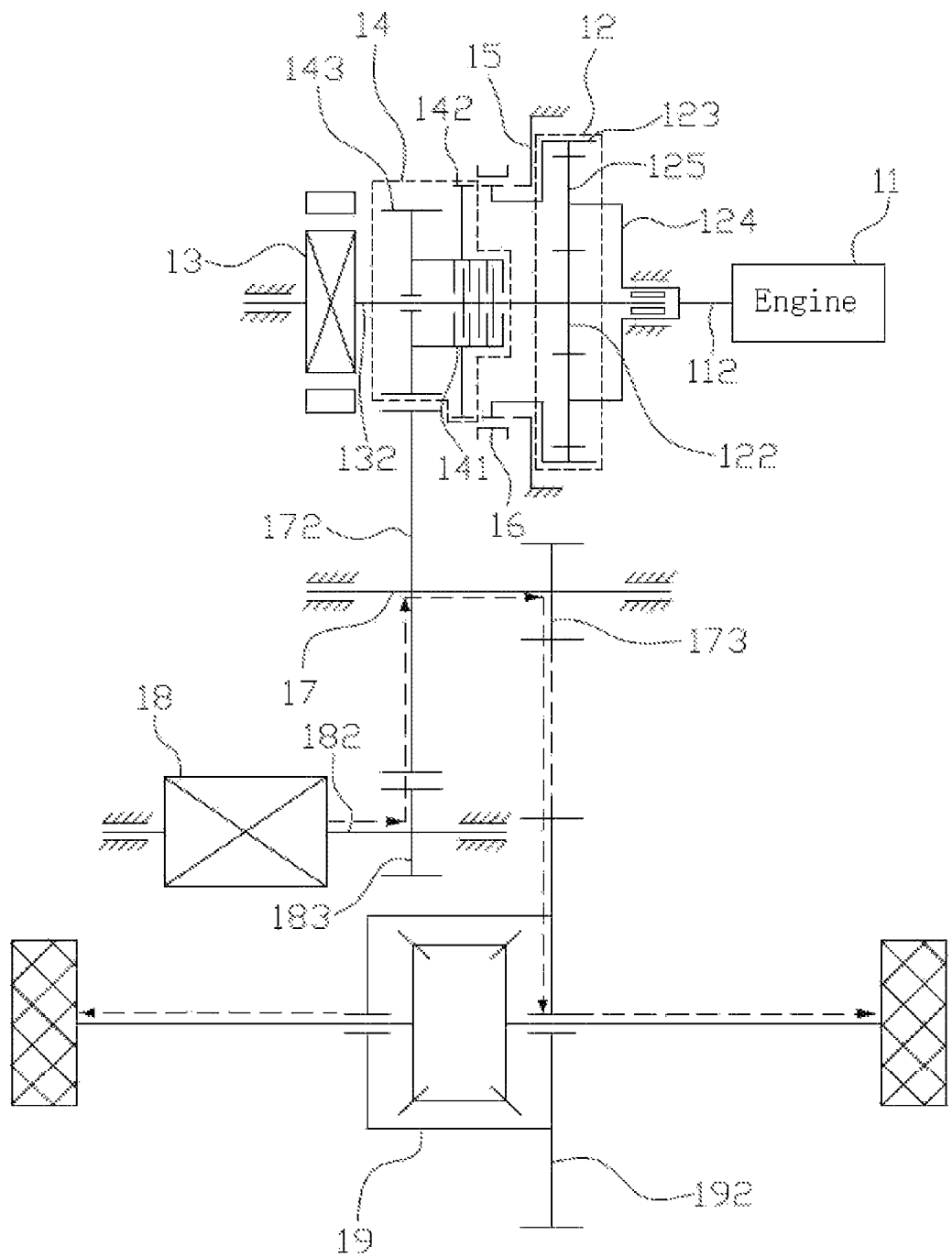
FIG. 2 is a schematic diagram of power transmission of the hybrid power driving system of FIG. 1 in a first-stage pure electric mode.

FIG. 2 is a schematic diagram of power transmission of the hybrid power driving system of FIG. 1 in a first-stage pure electric mode. The power transmission direction is as shown by the direction of an arrow in the figure. In the first-stage pure electric mode, the clutch 141 does not operate, the synchronizer 16 is at the intermediate station, neither the engine 11 nor the first motor 13 operates, and the second motor 18 performs driving. At this time, the power transmission has a path that transmits power by the second motor 18 through the third gear 183 to the first gear 172, the intermediate shaft 17, the second gear 173, the differential gear 192, the differential 19, and the wheel end finally. When the vehicle is driving at low to medium speeds, the hybrid power driving system 10 can perform driving in the first-stage pure electric mode.

Figure 3:
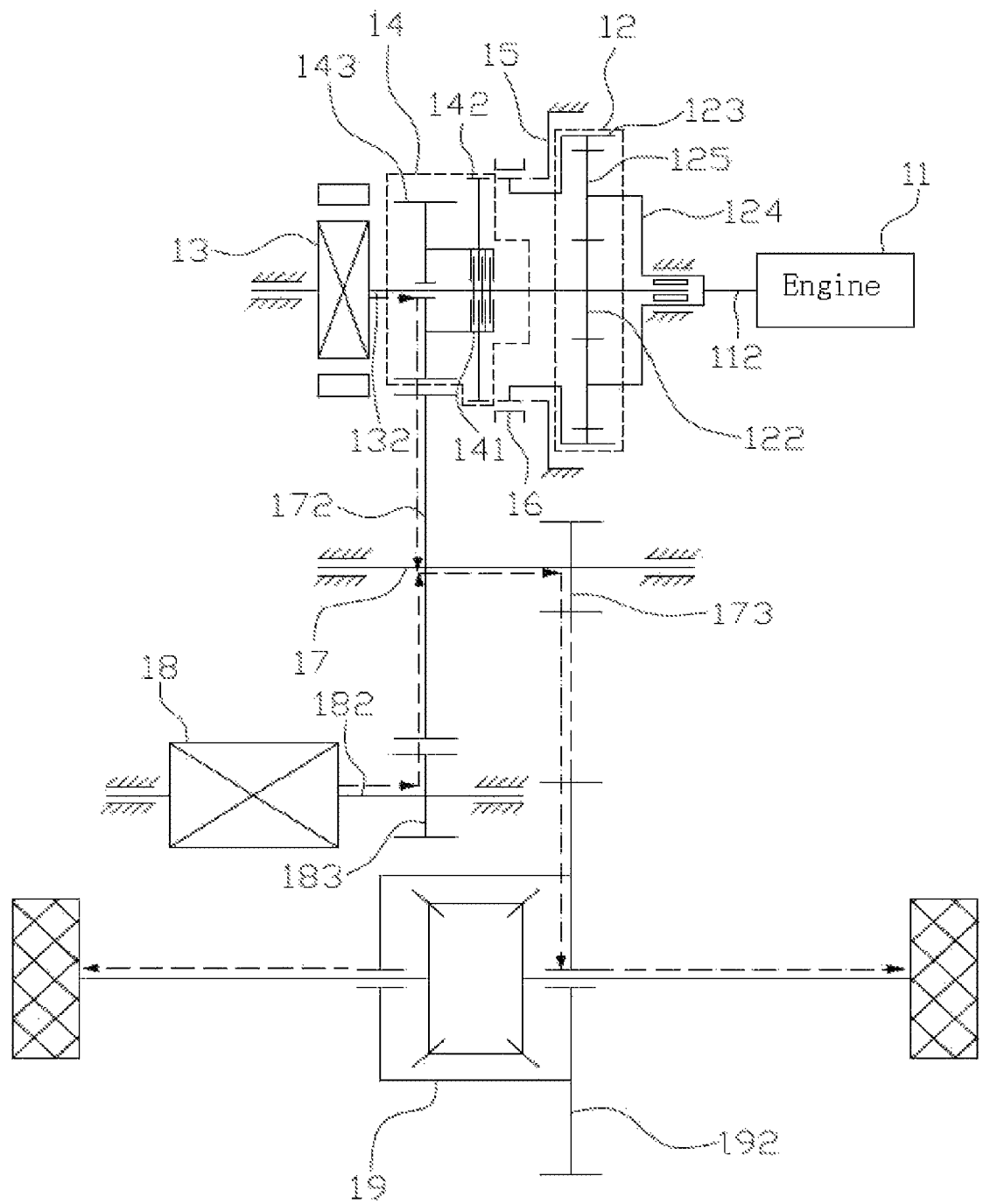
FIG. 3 is a schematic diagram of power transmission of the hybrid power driving system of FIG. 1 in a second-stage pure electric mode.

FIG. 3 is a schematic diagram of power transmission of the hybrid power driving system of FIG. 1 in a second-stage pure electric mode. The power transmission direction is as shown by the direction of an arrow in the figure. In the second-stage pure electric mode, the clutch 141 operates, the clutch gear 143 is fixedly connected to the first motor output shaft 132 through the clutch 141, the synchronizer 16 is at the intermediate station, and both the first motor 13 and the second motor 18 perform driving. At this time, the power transmission has two paths, wherein the first path transmits power by the first motor 13 through the clutch gear 143 to the first gear 172, the intermediate shaft 17, the second gear 173, the differential gear 192, the differential 19, and the wheel end finally; and the second path transmits power by the second motor 18 through the third gear 183 to the first gear 172, the intermediate shaft 17, the second gear 173, the differential gear 192, the differential 19, and the wheel end finally. When the vehicle is driving at a high speed, the hybrid power driving system 10 can perform driving in the second-stage pure electric mode.

Figure 4:
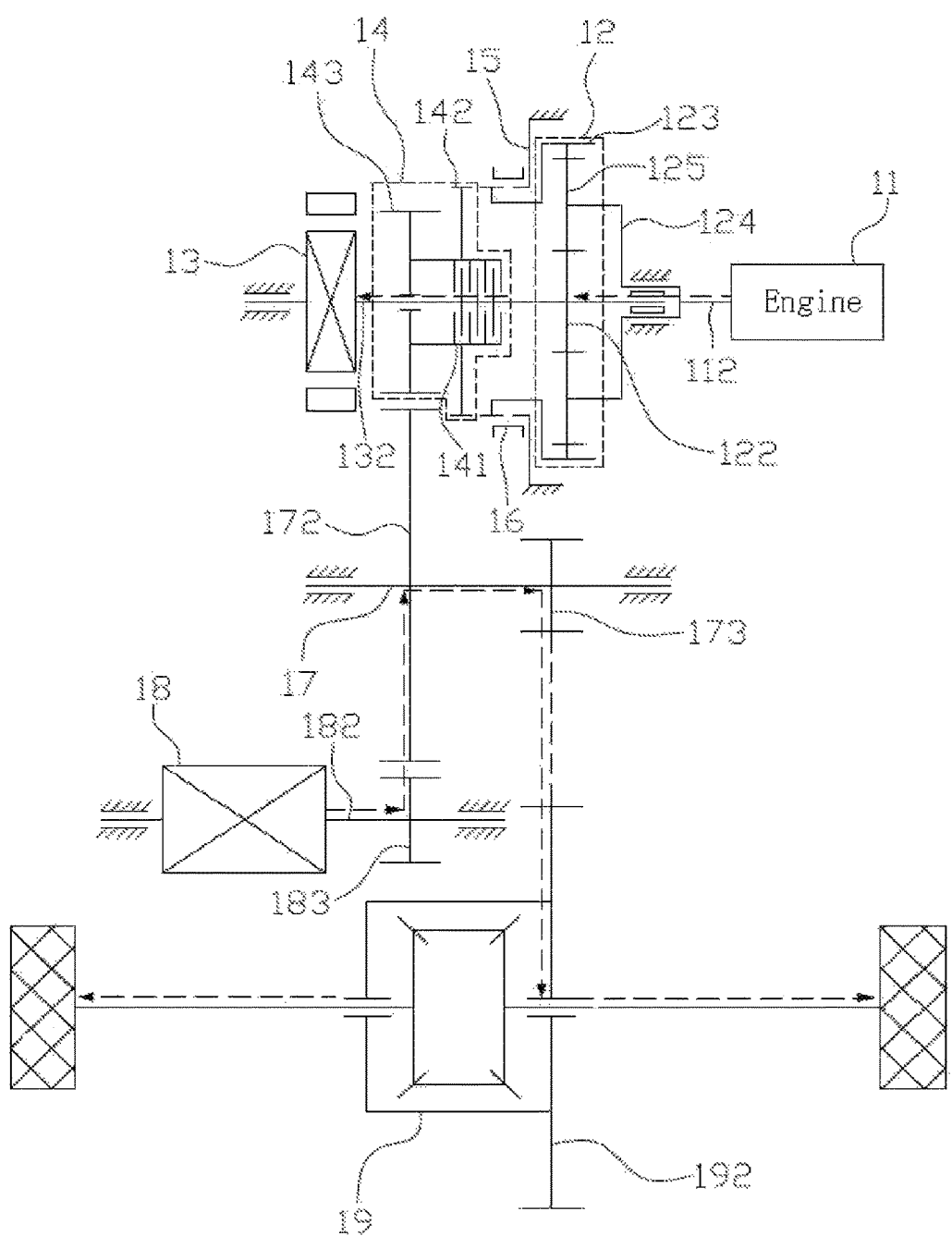
FIG. 4 is a schematic diagram of power transmission of the hybrid power driving system of FIG. 1 in an extended range mode.

FIG. 4 is a schematic diagram of power transmission of the hybrid power driving system of FIG. 1 in an extended range mode. The power transmission direction is as shown by the direction of an arrow in the figure. In the extended range mode, the synchronizer 16 is at the right station, the brake device 15 brakes the gear ring 123, the engine 11 drives the planetary carrier 124 to transmit power to the sun gear 122 and then to the first motor 13, the engine 11 drives the first motor 13 to generate electricity, and electric energy generated by the first motor 13 may exist in the power battery or may be directly supplied to the second motor 18 for driving of the second motor 18. At this time, the power transmission has a path that transmits power by the second motor 18 through the third gear 183 to the first gear 172, the intermediate shaft 17, the second gear 173, the differential gear 192, the differential 19, and the wheel end finally.

Figure 5:
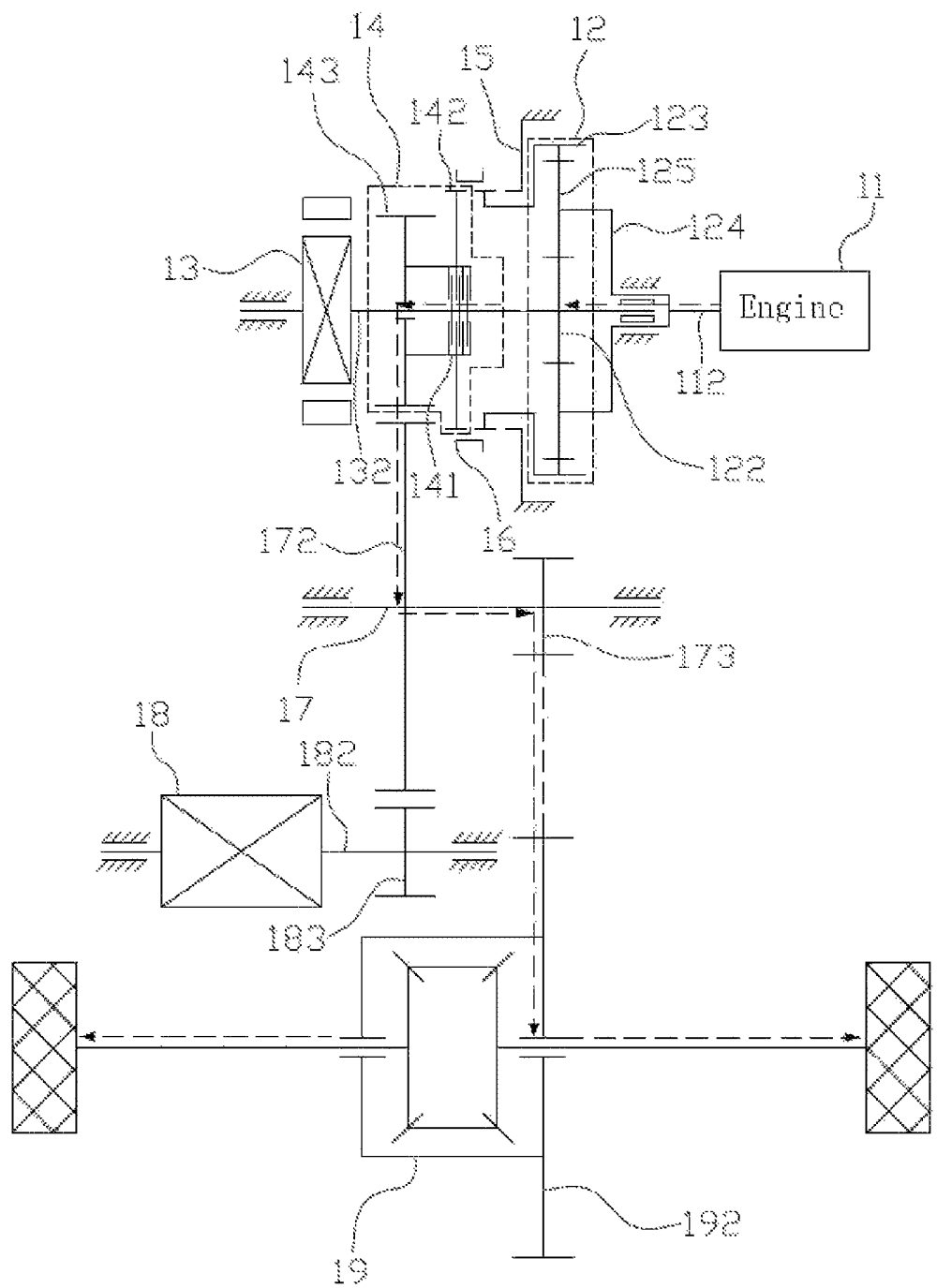
FIG. 5 is a schematic diagram of power transmission of the hybrid power driving system of FIG. 1 in a first-stage engine direct-drive mode.

FIG. 5 is a schematic diagram of power transmission of the hybrid power driving system of FIG. 1 in a first-stage engine direct-drive mode. The power transmission direction is as shown by the direction of an arrow in the figure. In the first-stage engine direct-drive mode, the clutch 141 operates, the clutch gear 143 is fixedly connected to the first motor output shaft 132 through the clutch 141, the synchronizer 16 is at the left station, the gear ring 123 and the engagement element 142 are engaged and fixed together, the engine 11 performs driving, and neither the first motor 13 nor the second motor 18 operates. At this time, the speed ratio of the entire planetary gear device 12 is 1, the rotational speeds of the sun gear 122, the planetary carrier 124 and the gear ring 123 are the same, the power transmission has a path in which the engine 11 drives the entire planetary gear device 12 to rotate and transmits power through the clutch gear 143 to the first gear 172, the intermediate shaft 17, the second gear 173, the differential gear 192, the differential 19, and the wheel end finally. When the vehicle is driving at low to medium speeds, the hybrid power driving system 10 can perform driving in the first-stage engine direct-drive mode.

Figure 6:
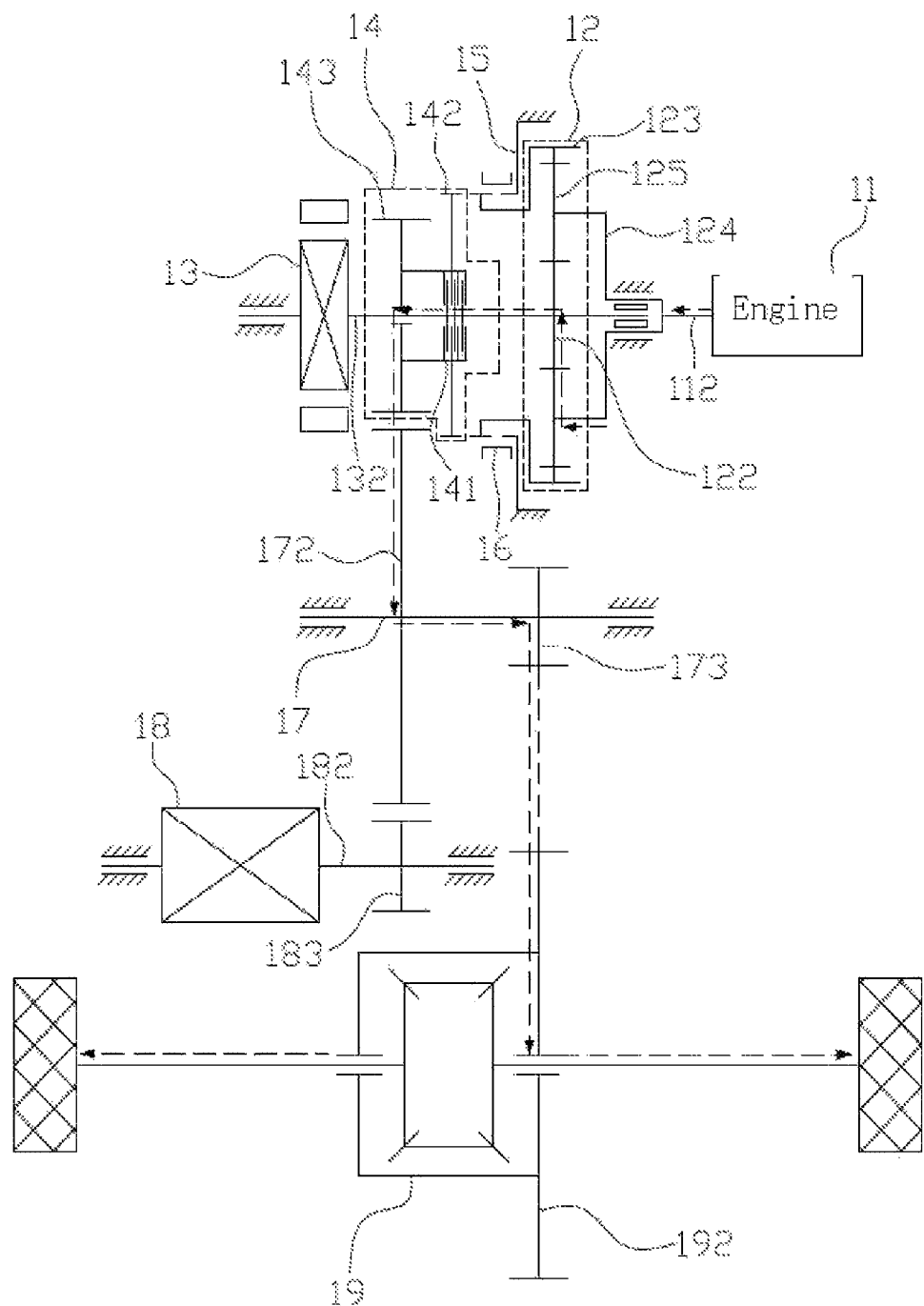
FIG. 6 is a schematic diagram of power transmission of the hybrid power driving system of FIG. 1 in a second-stage engine direct-drive mode.

FIG. 6 is a schematic diagram of power transmission of the hybrid power driving system of FIG. 1 in a second-stage engine direct-drive mode. The power transmission direction is as shown by the direction of an arrow in the figure. In the second-stage engine direct-drive mode, the clutch 141 operates, the clutch gear 143 is fixedly connected to the first motor output shaft 132 through the clutch 141, the synchronizer 16 is at the right station, the brake device 15 brakes the gear ring 123, the engine 11 performs driving, and neither the first motor 13 nor the second motor 18 operates. At this time, the power transmission has a path in which the engine 11 drives the planetary carrier 124, transmits power to the sun wheel 122 and then transmits the power by the clutch gear 143 to the first gear 172, the intermediate shaft 17, the second gear 173, the differential gear 192, the differential 19, and the wheel end finally. When the vehicle is driving at medium to high speeds, the hybrid power driving system 10 can perform driving in the second-stage engine direct-drive mode.

Figure 7:
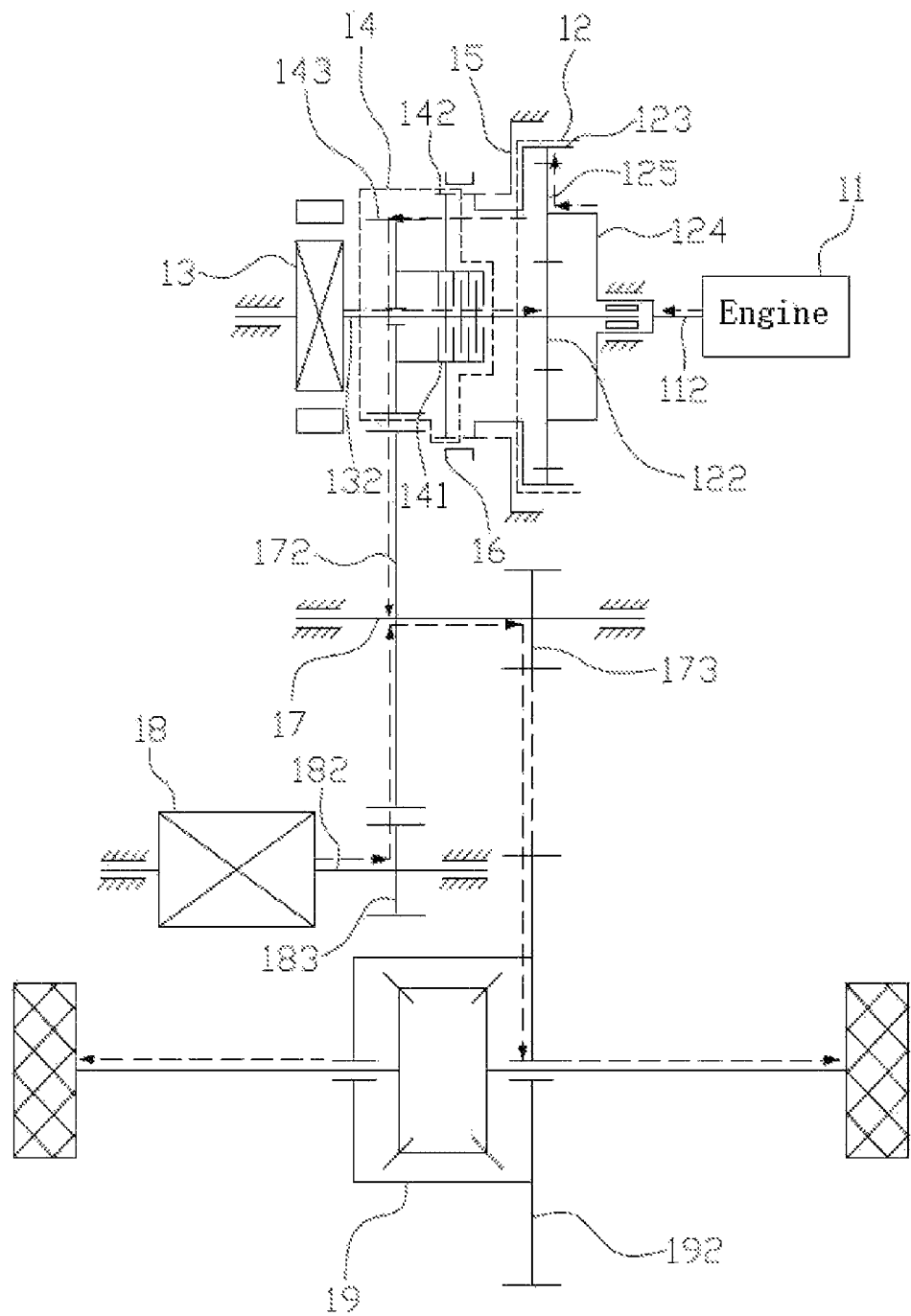
FIG. 7 is a schematic diagram of power transmission of the hybrid power driving system of FIG. 1 in a first-stage hybrid power mode.

FIG. 7 is a schematic diagram of power transmission of the hybrid power driving system of FIG. 1 in a first-stage hybrid power mode. The power transmission direction is as shown by the direction of an arrow in the figure. In the first-stage hybrid power mode, the clutch 141 does not operate, the synchronizer 16 is at the left station, the gear ring 123 and the engagement element 142 are engaged and fixed together, the engine 11 drives the planetary carrier 124 to rotate, the first motor 13 drives the sun gear 122 to rotate, the engine 11 and the first motor 13 are steplessly coupled by the planetary gear device 12, and the engine 11 and the second motor 18 perform driving finally. At this time, the power transmission has two paths, wherein in the first path, power of the engine 11 is transmitted by the planetary carrier 124, power of the first motor 13 is transmitted by the sun gear 122, and the power of the engine 11 and the first motor 13 is steplessly coupled by the planetary gear device 12, output by the gear ring 123, and transmitted through the clutch gear 143 to the first gear 172, the intermediate shaft 17, the second gear 173, the differential gear 192, the differential 19, and the wheel end finally; and in the second path, power is transmitted by the second motor 18 through the third gear 183 to the first gear 172, the intermediate shaft 17, the second gear 173, the differential gear 192, the differential 19, and the wheel end finally. It is worth mentioning that when the hybrid power driving system 10 performs driving in the first-stage hybrid power mode, the system is in an Electronic Controlled Variable Transmission (ECVT) stepless speed regulation mode, and the operating point of the engine 11 can be adjusted by the first motor 13 and the second motor 18 to decouple an output torque from the wheel end, so that the engine 11 is always operating in a high efficiency zone, which ensures system power and economy. When the vehicle is driving at a full speed, the hybrid power driving system 10 can perform driving in the first-stage hybrid power mode.

Figure 8:
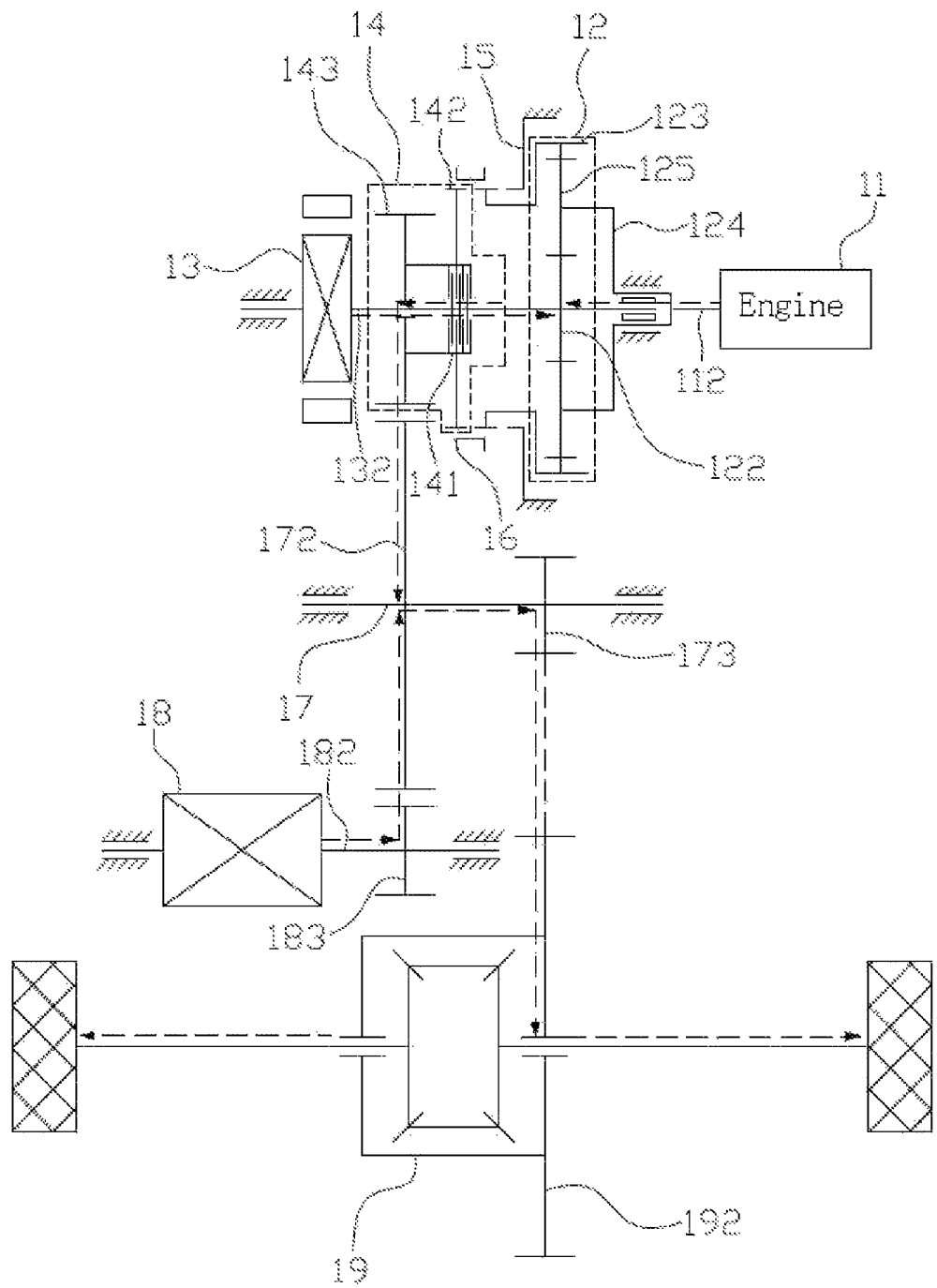
FIG. 8 is a schematic diagram of power transmission of the hybrid power driving system of FIG. 1 in a second-stage hybrid power mode.

FIG. 8 is a schematic diagram of power transmission of the hybrid power driving system of FIG. 1 in a second-stage hybrid power mode. The power transmission direction is as shown by the direction of an arrow in the figure. In the second-stage hybrid power mode, the clutch 141 operates, the clutch gear 143 is fixedly connected to the first motor output shaft 132 through the clutch 141, the synchronizer 16 is at the left station, the gear ring 123 and the engagement element 142 are engaged and fixed together, and the engine 11, the first motor 13 and the second motor 18 all perform driving. At this time, the speed ratio of the entire planetary gear device 12 is 1, the rotational speeds of the sun gear 122, the planetary carrier 124 and the gear ring 123 are the same, and the power transmission has two paths, wherein in the first path, power of the engine 11 is transmitted by the planetary carrier 124, power of the first motor 13 is transmitted by the sun gear 122, and the power is finally transmitted through the clutch gear 143 to the first gear 172, the intermediate shaft 17, the second gear 173, the differential gear 192, the differential 19, and the wheel end finally; and in the second path, power is transmitted by the second motor 18 through the third gear 183 to the first gear 172, the intermediate shaft 17, the second gear 173, the differential gear 192, the differential 19, and the wheel end finally. When the vehicle is driving at, low to medium speeds, the hybrid power driving system 10 can perform driving in the second-stage hybrid power mode.

Figure 9:
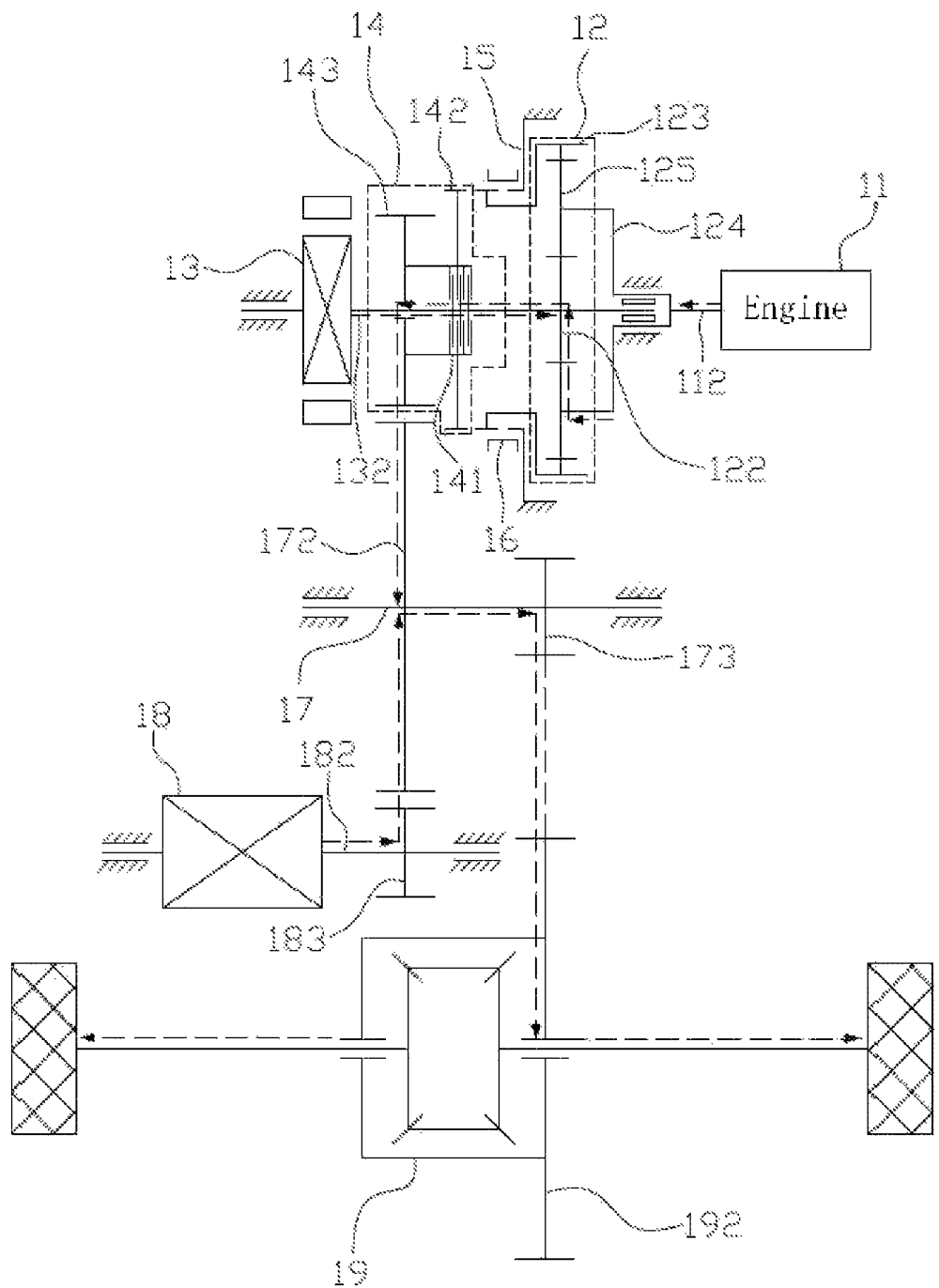
FIG. 9 is a schematic diagram of power transmission of the hybrid power driving system of FIG. 1 in a third-stage hybrid power mode.

FIG. 9 is a schematic diagram of power transmission of the hybrid power driving system of FIG. 1 in a third-stage hybrid power mode. The power transmission direction is as shown by the direction of an arrow in the figure. In the third-stage hybrid power mode, the clutch 141 operates, the clutch gear 143 is fixedly connected to the first motor output shaft 132 through the clutch 141, the synchronizer 16 is at the right station, the brake device 15 brakes the gear ring 123, and the engine 11, the first motor 13 and the second motor 18 all perform driving. At this time, the power transmission has two paths, wherein in the first path, the engine 11 drives the planetary carrier 124 to transmit power to the sun gear 122, the first motor 13 also transmits power to the sun gear 122, and after the power is coupled, the power is transmitted by the clutch gear 143 to the first gear 172, the intermediate shaft 17, the second gear 173, the differential gear 192, the differential 19, and the wheel end finally; and in the second path, power is transmitted by the second motor 18 through the third gear 183 to the first gear 172, the intermediate shaft 17, the second gear 173, the differential gear 192, the differential 19, and the wheel end finally. When the vehicle is driving at medium to high hybrid power driving system 10 are switched according to the determination result. It is to be noted that the first threshold is used to determine the level of the SOC value of the power battery, and the second threshold is used to determine the level of the vehicle speed. In the present embodiment, the range of the first threshold and the second threshold is not limited. Generally, it can be freely set according to a specific control strategy. Under different control strategies, the values of the first threshold and the second threshold are different. After the first threshold and the second threshold are set, automatic determination is performed, and automatic switching between various modes is performed according to the determination result. The above operating mode is embodied in the following table:

| Mode | Power device | | | Execution element | | | Use condition | |
|---|---|---|---|---|---|---|---|---|
| | Engine | First motor | Second motor | Clutch | Synchronizer | Brake device | SOC | Vehicle speed |
| First-stage pure electric mode | \ | \ | Drive | Disengagement | Intermediate station | \ | High | Low to medium speed |
| Second-stage pure electric mode | \ | Drive | Drive | Engagement | Intermediate station | \ | High | High speed |
| Extended range mode | Electric generation | Electric generation | Drive | Disengagement | Right station | Brake | Low | Low to medium speed |
| First-stage engine direct-drive mode | Drive | \ | \ | Engagement | Left station | \ | \ | Low to medium speed |
| Second-stage engine direct-drive mode | Drive | \ | \ | Engagement | Right station | Brake | \ | Medium to high speed |
| First-stage hybrid power mode | Drive | Electric generation | Drive | Disengagement | Left station | \ | \ | Full speed |
| Second-stage hybrid power mode | Drive | Electric generation | Drive | Engagement | Left station | \ | \ | Low to medium speed |
| Third-stage hybrid power mode | Drive | Electricity generation | Drive | Engagement | Right station | Brake | \ | Medium to high speed |
| Brake electricity generation mode | \ | \ | Electric generation | \ | Intermediate station | \ | \ | Brake | speeds, the hybrid power driving system 10 can perform driving in the third-stage hybrid power mode.

Figure 10:
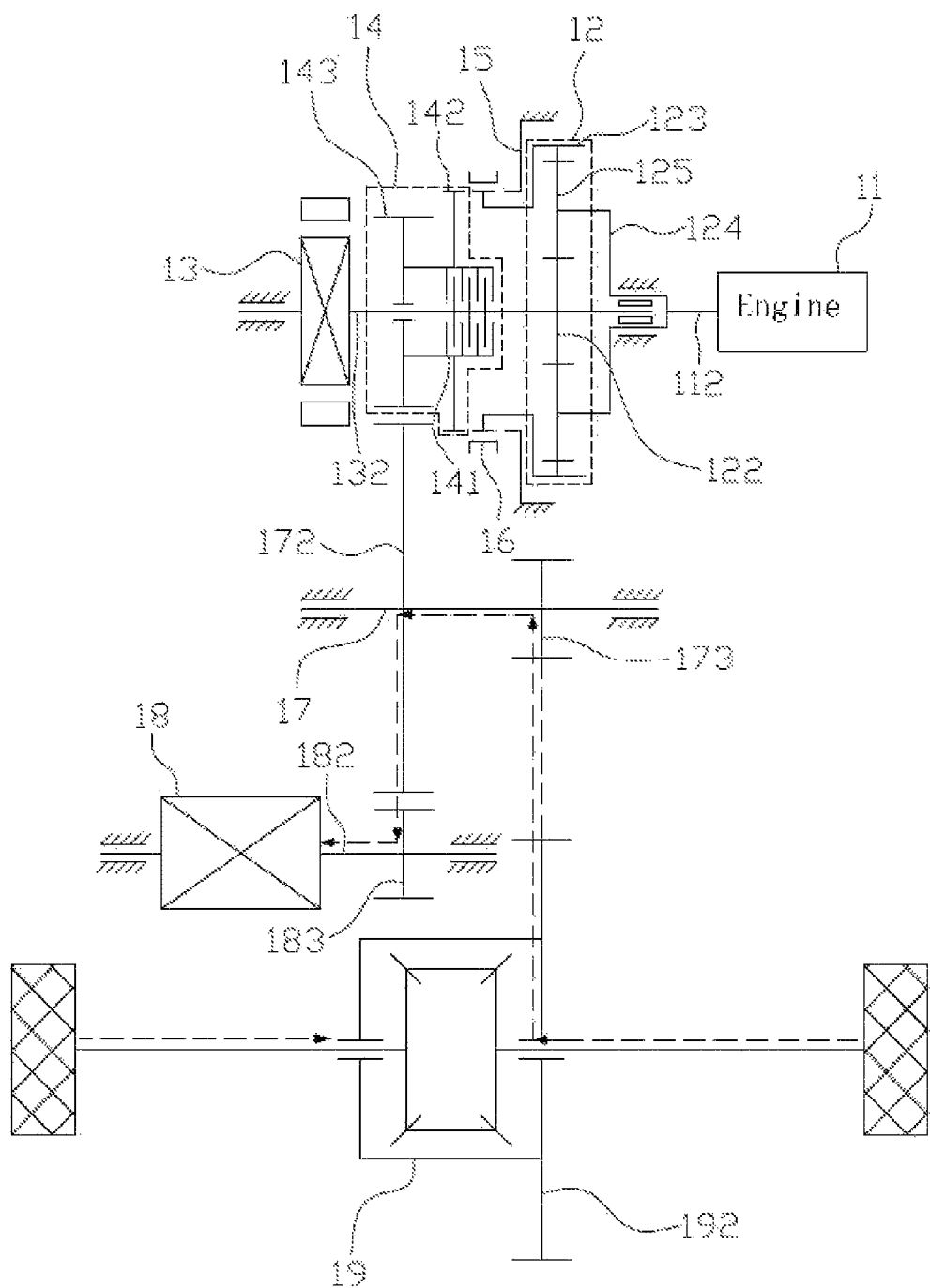
FIG. 10 is a schematic diagram of power transmission of the hybrid power driving system of FIG. 1 in a brake electricity generation mode.

FIG. 10 is a schematic diagram of power transmission of the hybrid power driving system of FIG. 1 in a brake electricity generation mode. The power transmission direction is as shown by the direction of an arrow in the figure. In the brake electricity generation mode, the clutch 141 does not operate, the synchronizer 16 is at the intermediate station, neither the engine 11 nor the first motor 13 operates, and the second motor 18 generates electricity. At this time, power during vehicle braking passes through the differential 19, the differential gear 192, the second gear 173, the intermediate shaft 17, the first gear 172 and the third gear 183 from the wheel end, and then is transmitted to the second motor 18 to drive the second motor 18 to rotate to generate electric energy.

Figure 11:
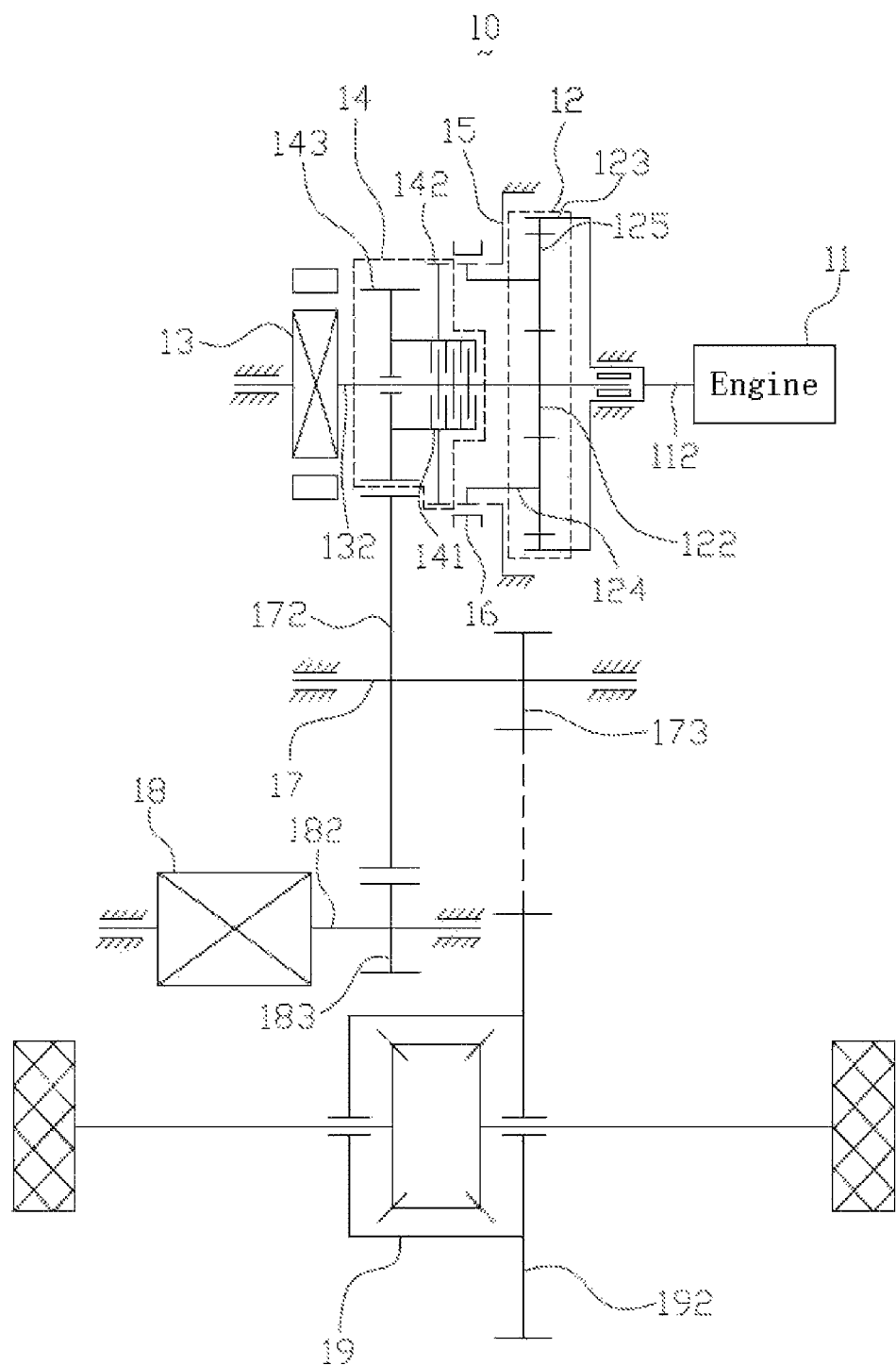
FIG. 11 is a structure diagram of a hybrid power driving system according to a second embodiment of the present disclosure.

The hybrid power driving system of the present embodiment 10 has a first-stage pure electric mode, a second-stage pure electric mode, an extended range mode, a first-stage engine direct-drive mode, a second-stage engine direct-drive mode, a first-stage hybrid power mode, a second-stage hybrid power mode, a third-stage hybrid power mode, and a brake electricity generation mode. Different modes can be automatically switched according to an SOC value and a vehicle speed requirement of the power battery. For example, a magnitude relationship between the SOC value of the power battery and a first threshold is determined, or a magnitude relationship between the SOC value of the power battery and a first threshold and a magnitude relationship between a vehicle speed and a second threshold are simultaneously determined. The operating modes of the Second Embodiment FIG. 11 is a structure diagram of a hybrid power driving system according to a second embodiment of the present disclosure. As shown in FIG. 11, the hybrid power driving system 10 of the present embodiment is substantially the same as the above first embodiment, except for the connection relationship between the engine 11 and the planetary gear device 12 and the connection relationship between the engagement device 16 and the planetary gear device 12.

Specifically, in the present embodiment, the first rotating element connected to the first motor 13 is the sun gear 122, the second rotating element connected to the engine 11 is the gear ring 123, and the third rotating element connected to the engagement device 16 is the planetary carrier 124.

That is, in the present embodiment, the sun gear 122 is connected to the first motor output shaft 132, the gear ring 123 is connected to the engine output shaft 112, and the planetary carrier 124 is connected to the engagement device 16.

The engagement device 16 is, for example, a synchronizer. The synchronizer 16 includes a left station, an intermediate station and a right station. When the synchronizer 16 is at the left station, the planetary carrier 124 and the engagement element 142 are engaged and fixed together, and at this time, the planetary carrier 124 and the engagement element 142 can synchronously rotate. When the synchronizer 16 is at the right station, the planetary carrier 124 and the brake device 15 are engaged, and at this time, the brake device 15 brakes the planetary carrier 124. When the synchronizer 16 is at the intermediate station, the planetary carrier 124 is separated from the engagement element 142, and the brake device 15 unlocks the planetary carrier 124.

The connection relationship between the remaining components of the hybrid power driving system 10 in the present embodiment may refer to the above first embodiment, and details are not described herein again.

The hybrid power driving system of the present embodiment 10 has a first-stage pure electric mode, a second-stage pure electric mode, an extended range mode, a first-stage engine direct-drive mode, a second-stage engine direct-drive mode, a first-stage hybrid power mode, a second-stage hybrid power mode, a third-stage hybrid power mode, and a brake electricity generation mode. The driving principle of the hybrid power driving system 10 in the present embodiment in various operating modes may be understood with reference to the above first embodiment, and details are not described herein again.

The hybrid power driving system provided by the embodiments of the present disclosure has a simple overall structure, has multiple operating modes such as a single-motor pure electric mode, a dual-motor pure electric mode, an extended range mode, two engine direct-drive modes, three hybrid power modes and a brake electricity generation mode, can automatically switch different modes according to an SOC value and vehicle speed requirement of a battery, and has strong flexibility; moreover, during switching of the operating modes, a second motor participates in driving, and power is not interrupted. In addition, an engine and a first motor are connected by a planetary gear device, the speed ratio is adjustable, and the speed ratio range is large, which can effectively reduce the volume of the first motor. The hybrid power driving system can cover HEV and PHEV, and the platformization is good.

The above implementations are merely embodiments of the present disclosure, and are not intended to limit the scope of implementations and claims of the present disclosure, and any equivalent changes and modifications made in the scope of protection of the present disclosure should fall within the scope of patent protection of the present disclosure.

INDUSTRIAL APPLICABILITY

The hybrid power driving system provided by the embodiments of the present disclosure has a simple overall structure, has multiple operating modes such as a single-motor pure electric mode, a dual-motor pure electric mode, an extended range mode, two engine direct-drive modes, three hybrid power modes and a brake electricity generation mode, can automatically switch different modes according to an SOC value and vehicle speed requirement of a battery, and has strong flexibility; moreover, during switching of the operating modes, a second motor participates in driving, and power is not interrupted. In addition, an engine and a first motor are connected by a planetary gear device, the speed ratio is adjustable, and the speed ratio range is large, which can effectively reduce the volume of the first motor. The hybrid power driving system can cover HEV and PHEV, and the platformization is good.

What is claimed is:

1. A hybrid power driving system, comprising an engine (11), a planetary gear device (12), a first motor (13), a clutch gear device (14), a brake device (15), an engagement device (16), an intermediate shaft (17), and a second motor (18), wherein the engine (11) and the first motor (13) are connected by the planetary gear device (12), the planetary gear device (12) comprises a first rotating element, a second rotating element and a third rotating element, the first rotating element is connected to the first motor (13), the second rotating element is connected to the engine (11), the third rotating element is connected to the engagement device (16), and the first rotating element, the second rotating element and the third rotating element are a respective one of a sun gear (122), a planetary carrier (124) and a gear ring (123);

the clutch gear device (14) is disposed between the first motor (13) and the planetary gear device (12), the clutch gear device (14) comprises a clutch (141), a clutch gear (143) connected to the clutch (141) and an engagement element (142) connected to the clutch (141), and the clutch gear (143) is connected to the intermediate shaft (17) and outputs power to a wheel end through the intermediate shaft (17);

the engagement device (16) is configured to engage the third rotating element and the engagement element (142), or engage the third rotating element and the brake device (15), or only engage the third rotating element;

the brake device (15) is configured to brake or unlock the third rotating element; and the second motor (18) is connected to the intermediate shaft (17) and outputs power to the wheel end through the intermediate shaft (17).

2. The hybrid power driving system as claimed in claim 1, wherein the first rotating element is the sun gear (122), the second rotating element is the planetary carrier (124), and the third rotating element is the gear ring (123).

3. The hybrid power driving system as claimed in claim 1, wherein the first rotating element is the sun gear (122), the second rotating element is the gear ring (123), and the third rotating element is the planetary carrier (124).

4. The hybrid power driving system as claimed in claim 1, wherein the engagement device (16) comprises a first station, a second station and a third station, when being at the first station, the engagement device (16) engages and fixes the third rotating element and the engagement element (142) together, when being at the second station, the engagement device (16) only engages the third rotating element, and when being at the third station, the engagement device (16) engages the third rotating element and the brake device (15) and brakes the third rotating element.

5. The hybrid power driving system as claimed in claim 4, wherein the engine (11) has an engine output shaft (112), the second rotating element is connected to the engine output shaft (112), the first motor (13) has a first motor output shaft (132), the first rotating element is connected to the first motor output shaft (132), the clutch gear device (14) is disposed on the first motor output shaft (132), a driving disc of the clutch (141) is fixedly connected to the first motor output shaft (132), the clutch gear (143) is sleeved on the first motor output shaft (132), and the engagement element (142) and the clutch gear (143) are fixedly connected to a driven disc of the clutch (141).

6. The hybrid power driving system as claimed in claim 5, wherein a first gear (172) and a second gear (173) are fixed to the intermediate shaft (17), and the first gear (172) is meshed with the clutch gear (143); the second motor (18) has a second motor output shaft (182), a third gear (183) is fixed to the second motor output shaft (182), and the third gear (183) is meshed with the first gear (172); and the hybrid power driving system further comprises a differential (19), a differential gear (192) is disposed on the differential (19), and the second gear (173) is meshed with the differential gear (192).

7. The hybrid power driving system as claimed in claim 6, wherein the hybrid power driving system has a first stage pure electric mode and a second-stage pure electric mode; in the first-stage pure electric mode, the clutch (141) does not operate, the engagement device (16) is at the second station, neither the engine (11) nor the first motor (13) operates, and the second motor (18) performs driving; and in the second-stage pure electric mode, the clutch (141) operates, the clutch gear (143) is fixedly connected to the first motor output shaft (132) through the clutch (141), the engagement device (16) is at the second station, the engine (11) does not operate, and both the first motor (13) and the second motor (18) perform driving.

8. The hybrid power driving system as claimed in claim 6, wherein the hybrid power driving system has an extended range mode; and in the extended range mode, the clutch (141) does not operate, the engagement device (16) is at the third station, the brake device (15) brakes the third rotating element, the engine (11) drives the first motor (13) to generate electricity, the first motor (13) supplies electric energy to the second motor (18), and the second motor (18) performs driving.

9. The hybrid power driving system as claimed in claim 6, wherein the hybrid power driving system has, a first-stage engine direct-drive mode and a second-stage engine direct-drive mode; in the first-stage engine direct-drive mode, the clutch (141) operates, the clutch gear (143) is fixedly connected to the first motor output shaft (132) through the clutch (141), the engagement device (16) is at the first station, the third rotating element and the engagement element (142) are engaged and fixed together, the engine (11) performs driving, and neither the first motor (13) nor the second motor (18) operates; and in the second-stage engine direct-drive mode, the clutch (141) operates, the clutch gear (143) is fixedly connected to the first motor output shaft (132) through the clutch (141), the engagement device (16) is at the third station, the brake device (15) brakes the third rotating element, the engine (11) performs driving, and neither the first motor (13) nor the second motor (18) operates.

10. The hybrid power driving system as claimed in claim 6, wherein the hybrid power driving system has a first-stage hybrid power mode, a second-stage hybrid power mode and a third-stage hybrid power mode; in the first-stage hybrid power mode, the clutch (141) does not operate, the engagement device (16) is at the first station, the third rotating element and the engagement element (142) are engaged and fixed together, and both the engine (11) and the second motor (18) perform driving; in the second-stage hybrid power mode, the clutch (141) operates, the clutch gear (143) is fixedly connected to the first motor output shaft (132) through the clutch (141), the engagement device (16) is at the first station, the third rotating element and the engagement element (142) are engaged and fixed together, and both the engine (11) and the second motor (18) perform driving; and in the third-stage hybrid power mode, the clutch (141) operates, the clutch gear (143) is fixedly connected to the first motor output shaft (132) through the clutch (141), the engagement device (16) is at the third station, the brake device (15) brakes the third rotating element, and both the engine (11) and the second motor (18) perform driving.

11. The hybrid power driving system as claimed in claim 6, wherein the hybrid power driving system has a brake electricity generation mode; and in the brake electricity generation mode, the clutch (141) does not operate, the engagement device (16) is at the second station, neither the engine (11) nor the first motor (13) operates, and power during vehicle brake is transferred to the second motor (18) by the wheel end to generate electricity.

12. The hybrid power driving system as claimed in claim 1, wherein the first motor (13), the clutch gear device (14), the planetary gear device (12) and the engine (11) are coaxially disposed.

13. The hybrid power driving system as claimed in claim 1, wherein the second motor (18) is parallel to the first motor (13).

14. The hybrid power driving system as claimed in claim 1, wherein the engagement device (16) is a synchronizer, and the brake device (15) is a brake or a one-way clutch.

* * * * *